United States Patent
Kasada et al.

(10) Patent No.: US 10,026,430 B2
(45) Date of Patent: Jul. 17, 2018

(54) MAGNETIC TAPE

(71) Applicant: FUJIFILM Corporation, Tokyo (JP)

(72) Inventors: Norihito Kasada, Minami-ashigara (JP); Masahito Oyanagi, Minami-ashigara (JP); Toshio Tada, Minami-ashigara (JP); Yasuhiro Kawatani, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/867,752

(22) Filed: Sep. 28, 2015

(65) Prior Publication Data
US 2016/0093322 A1    Mar. 31, 2016

(30) Foreign Application Priority Data
Sep. 29, 2014   (JP) .................... 2014-199022

(51) Int. Cl.
*G11B 5/708*   (2006.01)
*G11B 5/70*    (2006.01)

(52) U.S. Cl.
CPC ............. *G11B 5/708* (2013.01); *G11B 5/70* (2013.01)

(58) Field of Classification Search
CPC ................................ G11B 5/70; G11B 5/708
See application file for complete search history.

(56) References Cited

U.S. PATENT DOCUMENTS

| | | | |
|---|---|---|---|
| 8,535,817 B2 | 9/2013 | Imaoka | |
| 2006/0019127 A1* | 1/2006 | Yamazaki | G11B 5/738 428/840.2 |
| 2009/0087689 A1* | 4/2009 | Doushita | G11B 5/70 428/844.8 |
| 2011/0052908 A1 | 3/2011 | Imaoka | |
| 2013/0084470 A1* | 4/2013 | Hattori | G11B 5/7013 428/842.3 |

FOREIGN PATENT DOCUMENTS

| | | |
|---|---|---|
| JP | 2011-048878 A | 3/2011 |
| JP | 2013-077360 A | 4/2013 |

OTHER PUBLICATIONS

Office Action dated Nov. 8, 2016, from the Japanese Patent Office in counterpart Japanese Application No. 2014-199022.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

The magnetic tape comprises, on a nonmagnetic support, a nonmagnetic layer comprising nonmagnetic powder and binder, and on the nonmagnetic layer, a magnetic layer comprising ferromagnetic powder, nonmagnetic powder, and binder, wherein a total thickness of the magnetic tape is less than or equal to 4.80 μm, and a coefficient of friction as measured on a base portion of a surface of the magnetic layer is less than or equal to 0.35.

19 Claims, No Drawings

MAGNETIC TAPE

CROSS-REFERENCE TO RELATED APPLICATIONS

This application claims priority under 35 U.S.C 119 to Japanese Patent Application No. 2014-199022 filed on Sep. 29, 2014. The above application is hereby expressly incorporated by reference, in its entirety.

BACKGROUND OF THE INVENTION

Field of the Invention
The present invention relates to a magnetic tape.
Discussion of the Background
Magnetic recording media include tape-shaped media and disk-shaped media. Magnetic recording media in the form of tapes, that is, magnetic tapes, are primarily employed in storage applications such as data-backup tapes.

To record and reproduce signals on a magnetic tape, the magnetic tape is normally run within a drive and the surface of the tape (surface of the magnetic layer) and the head are brought into contact (slide). Conventionally, in addition to ferromagnetic powder, nonmagnetic powder has been added to the magnetic layers of magnetic tapes on which signals are recorded and reproduced in that manner (for example, see Japanese Unexamined Patent Publication (KOKAI) No. 2011-48878 or English language family members US2011/052908A1 and U.S. Pat. No. 8,535,817, which are expressly incorporated herein by reference in their entirety).

SUMMARY OF THE INVENTION

When running is repeatedly conducted with a high coefficient of friction during sliding of the surface of the magnetic layer and the head, running may become unstable, for example, which sometimes causes an increase in noise. Portions of the surface of the magnetic layer and the head may shave off and generate shavings that affect spacing, which sometimes ends up causing fluctuation in the output (spacing loss). Such increases in noise and spacing loss cause a drop in electromagnetic characteristics with repeated running. By contrast, the addition of nonmagnetic powder to the magnetic layer such as has been conventionally practiced can contribute to reducing the coefficient of friction during sliding of the surface of the magnetic layer and head.

In magnetic tapes, to increase the recording capacity per magnetic tape cartridge, the total thickness of the magnetic tape can be reduced (that is, the magnetic tape can be thinned) to increase the overall length of the tape that is contained in a magnetic tape cartridge. When the present inventors examined ways to reduce the thickness of magnetic tape, they determined that it was difficult to prevent a drop in electromagnetic characteristics with repeated running in a magnetic tape the total thickness of which had been reduced to less than or equal to 4.80 µm simply by adding nonmagnetic powder to the magnetic layer, as has been the practice in the past.

An aspect of the present invention provides for a magnetic tape the total thickness of which has been reduced to less than or equal to 4.80 µm and in which a drop in electromagnetic characteristics with repeated running can be prevented.

An aspect of the present invention relates to a magnetic tape,
which comprises, on a nonmagnetic support, a nonmagnetic layer comprising nonmagnetic powder and binder, and on the nonmagnetic layer, a magnetic layer comprising ferromagnetic powder, nonmagnetic powder, and binder, wherein
a total thickness of the magnetic tape is less than or equal to 4.80 µm; and
a coefficient of friction as measured on a base portion of a surface of the magnetic layer is less than or equal to 0.35.

The above magnetic tape, despite a total thickness reduced to less than or equal to 4.80 µm, can exhibit good electromagnetic characteristics with repeated running. The present inventors presume this to be due to the following.

The magnetic layer of the above magnetic tape contains nonmagnetic powder in addition to ferromagnetic powder as a powder component. Protrusions formed by nonmagnetic powder protruding from the surface of the magnetic layer are normally present on the surface of such a magnetic layer. Conventionally, the coefficient of friction that has been studied with regard to magnetic tapes is measured based on a region containing such protrusions, and can be controlled by means of such protrusions. By contrast, the present inventors discovered the effect of the coefficient of friction of the base portion, which is a coefficient of friction independent of the protrusions formed by nonmagnetic powder, on electromagnetic characteristics with repeated running in a magnetic tape the total thickness of which had been reduced to less than or equal to 4.80 µm. On that basis, they conducted further research and devised the above magnetic tape. This will be described in greater detail below.

The "base portion" as referred to in the present invention is the portion of the surface of the magnetic layer specified by the following method.

Defining the plane where the volumes of protruding components and indenting components equal out in the field of view as measured by an atomic force microscope (AFM) as the reference plane, protrusions are defined as protrusions greater than or equal to 15 nm in height from the reference plane. The reason for defining it as greater than or equal to 15 nm from the reference plane is that protrusions formed by nonmagnetic powder protruding from the surface of the magnetic layer as set forth above can be thought of as existing on the surface of the magnetic layer mainly as protrusions greater than or equal to 15 nm in height from the reference plane. The portion where the number of protrusions greater than or equal to 15 nm in height from the reference plane is zero, that is, the portion where no protrusions greater than or equal to 15 nm in height from the reference plane are detected on the surface of the magnetic layer, is specified as the base portion.

The coefficient of friction that is measured on the base portion refers to the value that is measured by the following method.

On the base portion (measurement spot: a 10 µm length in the longitudinal direction of a magnetic tape), a spherical indenter made of diamond that is 1 µm in radius is passed back and forth once at a load of 100 µN and at a speed of 1 µm/s to measure the frictional force (horizontal force) and normal force. The frictional force and normal force that are measured are arithmetic averages obtained by constantly measuring the frictional force and normal force during one back and forth pass. This measurement can be conducted, for example, with a model TI-95 Triboindenter made by Hysitron Corp. The µ value of the coefficient of friction is calculated from the arithmetic average of the frictional force and the arithmetic average of the normal force that are measured. The coefficient of friction is a value that is obtained from the equation: $F=\mu N$ from the frictional force (horizontal force) F (unit: Newtons (N)) and the normal force N (unit: Newtons (N)). The above measurement and calculation of coefficient of friction µ value is conducted for three portions of the base portion randomly determined on the surface of the magnetic layer and the arithmetic average of the three measured values obtained is adopted as the coefficient of friction measured on the base portion.

In one embodiment, the ferromagnetic powder is selected from the group consisting of ferromagnetic hexagonal ferrite powder and ferromagnetic metal powder.

In one embodiment, the nonmagnetic powder contained in the magnetic layer comprises two or more kinds of nonmagnetic powder with different Mohs hardness.

In one embodiment, the nonmagnetic powder contained in the magnetic layer comprises inorganic powder with Mohs hardness of higher than 8.

In one embodiment, the nonmagnetic powder contained in the magnetic layer comprises nonmagnetic colloidal particles.

In one embodiment, the nonmagnetic powder contained in the magnetic layer comprises additional nonmagnetic powder together with inorganic powder with Mohs hardness of higher than 8 and nonmagnetic colloidal particles.

In one embodiment, the additional nonmagnetic powder is colcothar.

In one embodiment, the centerline average surface roughness Ra measured with a noncontact surface profile measuring apparatus on the surface of the magnetic layer is less than or equal to 1.8 nm.

The term "centerline average surface roughness Ra measured with a noncontact surface profile measuring apparatus" refers to the centerline average surface roughness Ra measured in a region 350 µm×260 µm in area on the surface of the magnetic layer using a 20-fold object lens. By way of example, an optical three-dimensional roughness meter can be employed as the noncontact surface profile measuring apparatus. The centerline average surface roughness Ra that is measured with the noncontact surface profile measuring apparatus indicated in Examples given further below is a value that is measured with a noncontact optical roughness-measuring apparatus, which is an optical three-dimensional roughness-measuring apparatus, in the form of NEWVIEW (Japanese registered trademark) 5022 made by Zygo.

In one embodiment, the coefficient of friction measured on the base portion of the surface of the magnetic layer is less than or equal to 0.30.

In one embodiment, the magnetic tape has a backcoat layer comprising nonmagnetic powder and binder on the opposite surface of the nonmagnetic support from the surface on which the nonmagnetic layer and magnetic layer are present.

A further aspect of the present invention relates to a method of manufacturing the above magnetic tape, comprising forming a magnetic layer with ferromagnetic powder in the form of first ferromagnetic powder, and one or more kinds of ferromagnetic powder with larger average particle sizes than the first ferromagnetic powder.

In one embodiment, the average particle size of the first ferromagnetic powder falls within a range of 10 to 50 nm. When employing ferromagnetic powders of differing average particle size as ferromagnetic powder as set forth above, the term "ferromagnetic powders of differing average particle size" refers to all or some part of the ferromagnetic powder lot having different average particle sizes. A particle size distribution based on volume or based on number of ferromagnetic powder contained in the magnetic layer of a magnetic tape formed using ferromagnetic powders of differing average particle sizes in this manner can be measured by a known measurement method such as the dynamic light scattering method or laser diffraction. When this is done, at the average particle size of the ferromagnetic powder employed in the greatest proportion, or in the vicinity thereof, a maximum peak will normally be found in the particle size distribution curve obtained by measurement. There will also be cases where a peak will be found at the average particle size of various ferromagnetic particles or in the vicinity thereof. Accordingly, when measuring the particle size distribution of ferromagnetic powder contained in the magnetic layer of a magnetic tape formed using the first ferromagnetic powder with an average particle size of 10 to 50 nm, for example, in the greatest proportion, a maximum peak will normally be found within the particle size range of 10 to 50 nm in the particle size distribution curve.

In one embodiment, the difference between the average particle size of the ferromagnetic powder of greater average particle size than the first ferromagnetic powder and the average particle size of the first ferromagnetic powder falls within a range of 10 to 80 nm.

In one embodiment, the mixing ratio of the first ferromagnetic powder and the ferromagnetic powder of greater average particle size than the first magnetic powder, based on weight, falls within a range of former:latter=90.0:10.0 to 99.9:0.1.

A further aspect of the present invention relates to a method of manufacturing a magnetic tape comprising forming a magnetic layer with additional nonmagnetic powder together with the nonmagnetic powder with Mohs hardness of higher than 8 and nonmagnetic colloidal particles.

In one embodiment, the average particle size of the additional nonmagnetic powder is greater than the average particle size of the ferromagnetic powder.

In one embodiment, the difference in the average particle size of the ferromagnetic powder and the average particle size of the additional nonmagnetic powder falls within a range of 10 to 80 nm.

In one embodiment, the mixing ratio of the ferromagnetic powder and the additional nonmagnetic powder, based on weight, falls within a range of former:latter=90.0:10.0 to 99.9:0.1.

An aspect of the present invention can provide a magnetic tape in which a drop in electromagnetic characteristics with repeated running can be inhibited in the form of a desirable magnetic tape that can contribute to enhancing recording capacity due to a total thickness of less than or equal to 4.80 µm.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The magnetic tape according to an aspect of the present invention is a magnetic tape, comprising, on a nonmagnetic support, a nonmagnetic layer comprising nonmagnetic powder and binder, and on the nonmagnetic layer, a magnetic layer comprising ferromagnetic powder, nonmagnetic powder, and binder, wherein a total thickness of the magnetic tape is less than or equal to 4.80 μm; and a coefficient of friction as measured on a base portion of a surface of the magnetic layer is less than or equal to 0.35.

Although in no way limiting the present invention, the present inventors assume the reasons for which the above magnetic tape can exhibit good electromagnetic characteristics with repeated running despite having a total thickness that is less than or equal to 4.80 μm to be as follows.

For example, when colloidal silica is incorporated as nonmagnetic powder into the magnetic layer as is done in Examples Japanese Unexamined Patent Publication (KOKAI) No. 2011-48878, the colloidal silica can protrude from the surface of the magnetic layer to form protrusions on the surface of the magnetic layer. Further, nonmagnetic powders such as alumina are often added to the magnetic layers of magnetic tapes as abrasives to enhance the performance of removing deposits from the magnetic head (a head cleaning function) of the surface of the magnetic layer. Protrusions can be formed on the surface of the magnetic layer by abrasives protruding from the surface of the magnetic layer.

Conventionally, the coefficient of friction that has been investigated with regard to magnetic tapes has been not the coefficient of friction of the base portion, but rather the coefficient of friction measured in an area containing protrusions. An example (see Japanese Unexamined Patent Publication (KOKAI) No. 2011-48878, paragraph 0094, item 2.) is measuring the coefficient of friction over a measurement length much greater than the measurement length (10 μm length) of coefficient of friction measurement on the base portion set forth above, such as the 45 mm length of the magnetic layer surface of a magnetic tape in an example of Japanese Unexamined Patent Publication (KOKAI) No. 2011-48878.

By contrast, the present inventors, quite to their surprise, made the discovery that in a magnetic tape the total thickness of which had been reduced to less than or equal to 4.80 μm, the coefficient of friction of the base portion, which had not conventionally been investigated, affected the electromagnetic characteristics with repeated running. For this reason, the present inventors thought that reducing the total thickness of the magnetic tape reduced the strength of the magnetic tape and rendered it flexible. As a result, the magnetic head and the base portion had a greater tendency to come in contact during running than in a magnetic tape with a total thickness of greater than 4.80 μm. However, this is nothing but a presumption, and the reasons are uncertain. Based on the above knowledge, the present inventors conducted further extensive research. As a result, they discovered that by keeping the coefficient of friction on the base portion of a magnetic tape the total thickness of which had been reduced to less than or equal to 4.80 μm, it was possible to obtain good electromagnetic characteristics with repeated running. An aspect of the present invention was devised on that basis.

However, the above contains presumptions by the present inventors, and is not intended to limit the present invention in any way.

The above magnetic tape will be described in greater detail below.

<Magnetic Layer>

(Coefficient of Friction on the Base Portion)

The coefficient of friction that is measured on the base portion of the surface of the magnetic layer of the above magnetic tape (also referred to as the "base portion friction" hereinafter) is less than or equal to 0.35. The method used to measure the coefficient of friction on the base portion is as set forth above. Keeping the base portion friction to less than or equal to 0.35 makes it possible to inhibit a drop in electromagnetic characteristics with repeated running in a magnetic tape with a total thickness of less than or equal to 4.80 μm. From the perspective of further inhibiting a drop in the electromagnetic characteristics with repeated running in the above magnetic tape, the base portion friction is desirably less than or equal to 0.30. By way of example, the base portion friction is greater than or equal to 1.00. However, from the perspective of inhibiting a drop in the electromagnetic characteristics with repeated running, the lower it is the better. Thus, no specific lower limit is set.

The present inventors assume that irregularities that are more microscopic than the protrusions that are formed on the surface of the magnetic layer by nonmagnetic powder contained in the magnetic layer are present on the base portion. The present inventors presume that the base portion friction can be adjusted by controlling the shape of these microscopic irregularities. Based on this presumption, the present inventors formed a magnetic layer using two or more kinds of ferromagnetic powder with different average particle sizes to control the shape of the irregularities of the base portion. As a result, it was possible to control the base portion friction to various values. Accordingly, an example of one way of adjusting the base portion friction is to use two or more kinds of ferromagnetic powder with different average particle sizes as ferromagnetic powder. More specifically, the present inventors assume that it is possible to form the above microscopic irregularities on the base portion by means of protrusions in the form of ferromagnetic powder of large average particle size, and that it is possible to increase the abundance of protrusions on the base portion by increasing the mixing ratio of ferromagnetic powder of larger average particle size (and conversely, to lower the abundance of protrusions on the base portion by decreasing the mixing ratio). This will be described in greater detail further below.

As another way, the present inventors formed a magnetic layer using additional nonmagnetic powder with an average particle size greater than that of the ferromagnetic powder together with the nonmagnetic powder capable of forming protrusions by protruding from the surface of the magnetic layer as set forth above to control the shape of irregularities on the base portion. They were thus able to control the base portion friction to various values. Accordingly, another example of a way of adjusting the base portion friction is to use this additional nonmagnetic powder when forming the magnetic layer. More specifically, the present inventors assume that the additional nonmagnetic powder becomes protrusions that form the above microscopic irregularities on the base portion, and that by increasing the mixing ratio of such nonmagnetic powder, it is possible to increase the abundance of protrusions on the base portion (and conversely, to lower the abundance of protrusions on the base portion by decreasing the mixing ratio). This will be described in greater detail further below.

Additionally, it is possible to adjust the base portion friction by combining the above two methods.

However, the above adjustment methods are examples. Any means of adjustment can be used to achieve a base portion friction of less than or equal to 0.35, and such embodiments are included in the present invention.

(Ferromagnetic Powder)

As set forth above, one way to adjust the base portion friction is control with the ferromagnetic powder. The various powders that are commonly employed as ferromagnetic powders in the magnetic layers of magnetic tapes can be employed as the ferromagnetic powder contained in the magnetic layer of the above magnetic tape.

For example, from the perspective of enhancing the recording density of the magnetic tape, it is desirable to employ a ferromagnetic powder with a small average particle size as the ferromagnetic powder employed in the greatest proportion in the magnetic layer. From this perspective, when employing ferromagnetic powders in the magnetic layer in the form of two or more kinds of ferromagnetic powder of differing average particle size, it is desirable to employ ferromagnetic powder with an average particle size of less than or equal to 50 nm as the ferromagnetic powder employed in the greatest proportion. From the perspective of stable magnetization, the average particle size of the ferromagnetic powder employed in the greatest proportion is desirably greater than or equal to 10 nm. When not employing two or more kinds of ferromagnetic powder of differing average particle size, but rather one ferromagnetic powder, the average particle size of the ferromagnetic powder employed is desirably less than or equal to 50 nm, and desirably less than or equal to 10 nm, for the above reasons.

By contrast, the ferromagnetic powder that is employed along with the ferromagnetic powder employed in the greatest proportion desirably has an average particle size that is greater than that of the ferromagnetic powder that is employed in the greatest proportion. That is because it is assumed that protrusions formed on the base portion by ferromagnetic powder of large average particle size can reduce the base portion friction. From this perspective, the difference between the average particle size of the ferromagnetic powder employed in the greatest proportion and the average particle size of the ferromagnetic powder employed with it, denoted as the "(average particle size of the latter)−(average particle size of the former)", desirably falls within a range of 10 to 80 nm, preferably falls within a range of 10 to 50 nm, more preferably falls within a range of 10 to 40 nm, and still more preferably, falls within a range of 12 to 35 nm. It is also naturally possible to employ two or more kinds of ferromagnetic powder of differing average particle size as the ferromagnetic powder that is employed with the ferromagnetic powder employed in the greatest proportion. In that case, the average particle size of at least one of the two or more kinds of ferromagnetic powder desirably satisfies the above difference with the average particle size of the ferromagnetic powder employed in the greatest proportion. It is desirable for the average particle sizes of more of the ferromagnetic powders to satisfy this difference, and preferably for all of the average particle sizes of the ferromagnetic powders to satisfy this difference.

From the perspective of controlling the base portion friction, it is desirable for the mixing ratio of the ferromagnetic powder employed in the greatest proportion to the additional ferromagnetic powder (when two or more kinds of additional ferromagnetic powder with differing average particle size are employed, the combined total thereof) to fall within a range based on weight of former:latter=90.0:10.0 to 99.9:0.1, preferably within a range of 95.0:5.0 to 99.5:0.5, with regard to two or more kinds of ferromagnetic powder of differing average particle size.

A portion of the above additional ferromagnetic powder can be replaced with nonmagnetic powder, described further below.

The average particle size of the ferromagnetic powder in the present invention is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the ferromagnetic powder is ferromagnetic hexagonal ferrite powder. When the ferromagnetic powder employed in the greatest proportion is ferromagnetic hexagonal ferrite powder, the average particle size (average plate diameter), from the perspective of achieving high density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is a specific example of desirable ferromagnetic powder. When the ferromagnetic powder that is employed in the greatest proportion is ferromagnetic metal powder, the average particle size thereof (average major axis length), from the perspective of achieving higher density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powders. The contents of the above publications are expressly incorporated herein by reference in their entirety.

The above magnetic tape can contain ferromagnetic powder in the form of ferromagnetic hexagonal ferrite powder alone, ferromagnetic metal powder alone, or both.

The content (fill rate) of ferromagnetic powder in the magnetic layer desirably falls within a range of 50 to 90 weight percent, preferably within a range of 60 to 90 weight percent. A high fill rate is desirable from the perspective of raising the recording density.

(Binder, Curing Agent)

The magnetic tape according to an aspect of the present invention is a particulate magnetic tape that contains binder along with ferromagnetic powder in the magnetic layer. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer described further below. Reference can be made to paragraphs 0028 to 0031 of Japanese Unexamined Patent Publication (KOKAI) No. 2010-24113, which is expressly incorporated herein by reference in its entirety, with regard to the above binders.

Further, a curing agent can be employed along with the resin suitable for use as the binder. Polyisocyanate is suitable as the curing agent. Reference can be made to paragraphs 0124 to 0125 in Japanese Unexamined Patent Publication (KOKAI) No. 2011-216149, for details regarding polyisocyanates. The curing agent can be added to the coating composition used to form the magnetic layer in a quantity of, for example, 0 to 80 weight parts, preferably 50 weight parts to 80 weight parts from the perspective of enhancing the coating strength, per 100 weight parts of binder.

(Additive)

Additives can be added to the magnetic layer as needed. Examples of additives are abrasives, lubricants, dispersing agents and dispersion adjuvants, antifungal agents, antistatic agents, oxidation inhibitors, and carbon black. The additives can be selected for use from among commercial products based on the desired properties.

It is desirable to increase the smoothness of the surface of the magnetic layer in magnetic tapes for high-density recording such as data backup tapes. By increasing the smoothness of the surface of the magnetic layer, it is possible to reduce spacing loss. As a result, it is possible to achieve good electromagnetic characteristics when reproducing signals recorded at high density. From these perspectives, it is also desirable to increase the surface smoothness of the magnetic layer in the magnetic tape according to an aspect of the present invention.

The centerline average surface roughness Ra measured with a noncontact surface profile measuring apparatus on the surface of the magnetic layer can be employed as an indicator of the surface smoothness of the magnetic layer, in an embodiment. Details of the measurement method are as set forth above. To reduce spacing loss, the centerline average surface roughness Ra measured with a noncontact surface profile measuring apparatus on the surface of the magnetic layer of the above magnetic tape is desirably less than or equal to 1.8 nm, preferably less than or equal to 1.5 nm. Because running stability tends to decrease when the surface of the magnetic layer is extremely smooth, a level of greater than or equal to 0.2 nm is desirable from the perspective of running stability.

One example of a way of increasing the smoothness of the surface of the magnetic layer is to increase the dispersion of abrasive in the magnetic layer. To that end, in preparing the coating composition for forming the magnetic layer, the abrasive is desirably dispersed separately from the ferromagnetic powder. Preferably, various granular and powder-like components including the ferromagnetic powder are separately dispersed.

Another example of a way of increasing the smoothness of the surface of the magnetic layer is to employ a component (abrasive-dispersing agent) to increase the dispersion of the abrasive. An example of such a component is an aromatic hydrocarbon compound having a phenolic hydroxyl group. The term "phenolic hydroxyl group" refers to a hydroxyl group that is directly bonded to an aromatic ring.

The aromatic ring that is contained in the aromatic hydrocarbon compound having a phenolic hydroxyl group can be a single ring, can have a multiple-ring structure, or can be a fused ring. From the perspective of enhancing the dispersion of abrasive, an aromatic hydrocarbon compound comprising a benzene ring or a naphthalene ring is desirable. The aromatic hydrocarbon compound can comprise substituent(s) in addition to the phenolic hydroxyl group. From the perspective of the ready availability of compounds, examples of substituents in addition to a phenolic hydroxyl group are halogen atoms, alkyl groups, alkoxy groups, amino groups, acyl groups, nitro groups, nitroso groups, and hydroxyalkyl groups. With respect to compounds having substituent(s) in addition to the phenolic hydroxyl group, compounds having substituent(s) exhibiting an electron donating ability in the form of a Hammett substituent constant of less than or equal to 0.4 tend to be advantageous to the dispersion of abrasives. From this perspective, examples of desirable substituents are those having an electron-donating ability that is as good as or better than that of halogen atoms, more specifically, halogen atoms, alkyl groups, alkoxy groups, amino groups, and hydroxyalkyl groups.

The number of phenolic hydroxyl groups that are contained in the above aromatic hydrocarbon compound can be one, two, three, or more. When the aromatic ring present in the aromatic hydrocarbon compound is a naphthalene ring, it is desirable for two or more phenolic hydroxyl groups to be contained, preferably two. Examples of such compounds are the naphthalene ring-containing compounds denoted by general formula (1) in Japanese Unexamined Patent Publication (KOKAI) No. 2013-229090. Reference can be made to paragraphs 0028 to 0030 of that publication for details on naphthalene ring-containing compounds denoted by general formula (1) in Japanese Unexamined Patent Publication (KOKAI) No. 2013-229090. Additionally, aromatic hydrocarbon compounds containing an aromatic ring in the form of a benzene ring desirably contain one or more, preferably 1 or 2, phenolic hydroxyl groups. Examples of such compounds are the benzene ring-containing compounds denoted by general formula (2) in Japanese Unexamined Patent Publication (KOKAI) No. 2013-229090. Reference can be made to paragraphs 0032 to 0034 of that publication for details on benzene ring-containing compounds denoted by general formula (2) in Japanese Unexamined Patent Publication (KOKAI) No. 2013-229090. The content of the above publication is expressly incorporated herein by reference in its entirety.

One, two, or more aromatic hydrocarbon compounds having phenolic hydroxyl group(s) can be employed. The quantity employed is, for example, desirably about 2 to 20 weight parts per 100 weight parts of abrasive.

The magnetic tape according to an aspect of the present invention contains nonmagnetic powder along with ferromagnetic powder and binder in the magnetic layer. Nonmagnetic powder in the form of either nonmagnetic powder capable of functioning as an abrasive or a protrusion-forming agent that forms protrusion(s) by suitably protruding from the surface of the magnetic layer is desirably incorporated, with the incorporation of both being preferred. Nonmagnetic powder with high Mohs hardness is desirable and suitable as an abrasive. Nonmagnetic powder with Mohs hardness lower than that of nonmagnetic powders capable of functioning as an abrasive is suitable as a protrusion-forming agent. It is desirable to employ inorganic powder with Mohs hardness of higher than 8, and preferable to employ inorganic powder with Mohs hardness greater than or equal to 9, as an abrasive. The highest Mohs hardness is the 10 of diamond. Specific examples are alumina ($Al_2O_3$), silicon carbide, boron carbide ($B_4C$), TiC, cerium oxide, zirconium oxide ($ZrO_2$), and diamond powder. Of these, alumina is desirable. Alumina is also a desirable abrasive from the perspective of being able to achieve particularly good dispersion improvement when combined with the above aromatic hydrocarbon compound having phenolic hydroxyl group(s). Reference can be made to Japanese Unexamined Patent Publication (KOKAI) No. 2013-229090, paragraph 0021, with regard to alumina. The specific surface area can be employed as an indicator of abrasive particle size. The larger the specific surface area, the smaller the particle size indicated. From the perspective of increasing the smoothness of the surface of the magnetic layer, an abrasive having a specific surface area measured by the BET method (BET specific surface area) of greater than or equal to 14 $m^2/g$ is desirably employed. From the perspective of dispersion, the use of an abrasive with a BET specific surface area of less than or equal to 40 $m^2/g$ is desirably employed. The content of abrasive in the magnetic layer is desirably 1 to 20 weight parts per 100 weight parts of ferromagnetic powder.

Nonmagnetic powder with Mohs hardness of less than or equal to 8 is desirable as a nonmagnetic powder that is capable of functioning as a protrusion-forming agent. From the perspective of increasing the surface smoothness of the magnetic layer, colloidal particles (nonmagnetic colloidal particles) are desirable. The average primary particle size of nonmagnetic colloidal particles is desirably 50 to 200 nm. The average primary particle size of the nonmagnetic colloidal particles in the present invention is a value obtained by the method described in Japanese Unexamined Patent Publication (KOKAI) No. 2011-48878, paragraph 0015. The content of the above publication is expressly incorporated herein by reference in its entirety. Nonmagnetic colloidal particles in the form of inorganic colloidal particles are desirable and those in the form of inorganic oxide colloidal particles are preferred. From the perspective of ready availability of monodisperse colloidal particles, silica colloidal particles (colloidal silica) are particularly desirable. Silica colloidal particles have Mohs hardness of about 5 to 7. Reference can be made to Japanese Unexamined Patent Publication (KOKAI) No. 2011-48878, paragraph 0023, for details on nonmagnetic colloidal particles. The content of nonmagnetic colloidal particles in the magnetic layer is desirably 0.5 to 5 weight parts, preferably 1 to 3 weight parts, per 100 weight parts of ferromagnetic powder.

As set forth above, additional nonmagnetic powder can be employed in addition to the above-described nonmagnetic powder to control the base portion friction to less than or equal to 0.35. Such nonmagnetic powder desirably has Mohs hardness of less than or equal to 8. Various kinds of nonmagnetic powder that are commonly employed in the nonmagnetic layer can be employed. The details are as set forth further below for the nonmagnetic layer. An example of preferred nonmagnetic powder is colcothar. Colcothar has Mohs hardness of about 6.

In the same manner as for the ferromagnetic powder that is employed along with the ferromagnetic powder employed in the greatest proportion as set forth above, an average particle size that is greater than that of the ferromagnetic powder is desirable in the additional nonmagnetic powder. That is because it permits a reduction in the base portion friction by means of protrusions formed on the base portion by the additional nonmagnetic powder. From this perspective, the difference between the average particle size of the ferromagnetic powder and the average particle size of the additional nonmagnetic powder employed with it, obtained as "(average particle size of latter)–(average particle size of former)", desirably falls within a range of 10 to 80 nm, preferably within a range of 10 to 50 nm. When employing two or more kinds of ferromagnetic powder of differing average particle size as the ferromagnetic powder, the ferromagnetic powder that is employed in the greatest proportion is adopted among the two or more kinds of ferromagnetic powder as the ferromagnetic powder that is used to calculate the difference in average particle size with the additional nonmagnetic powder. It is naturally also possible to employ two or more kinds of nonmagnetic powder of differing average particle size as the additional nonmagnetic powder. In that case, it is desirable for the average particle size of at least one of the two or more kinds of nonmagnetic powder to satisfy the above difference, preferable for many of the average particle sizes of the nonmagnetic powders to satisfy this difference, and more preferable for the average particle sizes of all of the additional nonmagnetic powders to satisfy this difference.

From the perspective of controlling the base portion friction, the mixing ratio of the ferromagnetic powder and the above additional nonmagnetic powder (the combined total when employing two or more kinds of additional nonmagnetic powder with differing average particle sizes) based on weight desirably falls within a range of former: latter=90.0:10.0 to 99.9:0.1, preferably within a range of 95.0:5.0 to 99.5:0.5.

The magnetic layer set forth above is provided over a nonmagnetic layer on a nonmagnetic support. The nonmagnetic layer and nonmagnetic support are described in detail further below.

<Nonmagnetic Layer>

The nonmagnetic layer will be described next. In the magnetic tape according to an aspect of the present invention, a nonmagnetic layer containing nonmagnetic powder and binder is present between the nonmagnetic support and the magnetic layer. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content of nonmagnetic powder in the nonmagnetic layer desirably falls within a range of 50 to 90 weight percent, preferably within a range of 60 to 90 weight percent.

Binders, lubricants, dispersing agents, additives, solvents, dispersion methods, and the like of the magnetic layer can be applied to the nonmagnetic layer. Specifically, known techniques relating to magnetic layers can be applied as regards the quantity and type of binder and the quantities and types of additives and dispersing agents added.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Layer Configuration>

The thickness of the nonmagnetic support and various layers of the magnetic tape according to an aspect of the present invention are as follows. The thickness of the nonmagnetic support is desirably 3.00 to 4.50 µm. The thickness of the magnetic layer can be optimized based on the saturation magnetization and head gap length of the magnetic head employed and the recording signal band. It is normally 0.01 to 0.15 µm (10 to 150 nm), and from the perspective of achieving higher recording densities, it is desirably 0.02 to 0.12 µm (20 to 120 nm), preferably 0.03 to 0.10 µm (30 to 100 nm). A single magnetic layer suffices. The magnetic layer can be separated into two or more layers having differing magnetic properties. Known multilayer magnetic layer configurations can be applied.

The thickness of the nonmagnetic layer is, for example, 0.10 to 1.50 µm, desirably 0.10 to 1.00 µm. The nonmagnetic layer of the magnetic tape according to an aspect of the present invention may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Backcoat Layer>

In the magnetic tape according to an aspect of the present invention, a backcoat layer can be present on the opposite surface of the nonmagnetic support from the surface on which the magnetic layer is present. The backcoat layer desirably contains carbon black and inorganic powder. The formulas of the magnetic layer and nonmagnetic layer can be applied to the binder and various additives for forming the backcoat layer. The thickness of the backcoat layer is desirably less than or equal to 0.90 µm, preferably 0.10 to 0.70 µm.

<Total Thickness of the Magnetic Tape>

From the perspective of increasing the recording capacity of the magnetic tape, it is desirable to reduce the thickness of the magnetic tape to increase the recording capacity per magnetic tape cartridge. Because the magnetic tape according to an aspect of the present invention has a total thickness of less than or equal to 4.80 µm, it is a desirable magnetic tape from the perspective of increasing the recording capacity. However, as set forth above, in magnetic tapes with a total thickness of less than or equal to 4.80 µm, just adding nonmagnetic powder to the magnetic layer, as has conventionally been practiced, tends not to inhibit a drop in electromagnetic characteristics with repeated running. An aspect of the present invention can resolve the above by keeping the coefficient of friction on the base portion (base portion friction), which has conventionally not been a focus of attention, to less than or equal to 3.5. The total thickness of the magnetic tape can be, for example, less than or equal to 4.50 µm, or even less than or equal to 4.30 µm. However, being less than or equal to 4.80 µm can afford an ample improvement in recording capacity. Thus, it can be in excess of 4.50 µm, or in excess of 4.30 µm. From the perspective of ease of handling the magnetic tape (the handling property) and the like, the total thickness of the magnetic tape is desirably greater than or equal to 1.0 µm.

The various layers, nonmagnetic support, and total thickness of the magnetic tape can be determined by known methods of measuring film thickness. For example, a cross section of the magnetic tape in the direction of thickness can be exposed by a known technique such as the use of an ion beam or microtome, and the exposed cross-section can be observed by a scanning electron microscope. The thickness can be determined at one spot in the direction of thickness by cross-section observation, or thicknesses determined at two or more randomly selected spots—two spots, for example—can be arithmetically averaged, to obtain the various thicknesses. The thicknesses of various layers can also be obtained as design thicknesses calculated from manufacturing conditions.

<Manufacturing Process>

Coating compositions (coating liquids) for forming the magnetic layer, nonmagnetic layer, and backcoat layer normally contain solvent in addition to the various components set forth above. The various organic solvents that are commonly employed to manufacture particulate magnetic tapes can be employed. The process of preparing the coating compositions for forming the various layers normally includes at least a kneading step, a dispersion step, and mixing steps provided before and after these steps as needed. Each of these steps can be divided into two or more stages. All of the starting materials in the form of ferromagnetic powder, nonmagnetic powder, binder, various optionally added additives, solvent, and the like that are employed in the present invention can be added at the start, or part way through, any of these steps. An individual starting material can be divided for addition in two or more steps. In preparing the coating composition for forming the magnetic layer, as set forth above, it is desirable to separately disperse the abrasive and ferromagnetic powder. Known manufacturing techniques can be employed to manufacture the magnetic tape according to an aspect of the present invention. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the coating compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed. Reference can be made, by way of example, to Japanese Unexamined Patent Publication (KOKAI) No. 2010-24113, paragraphs 0051 to 0057, for details regarding methods of manufacturing magnetic tape.

As set forth above, in one embodiment, the above magnetic tape is manufactured with two or more kinds of ferromagnetic powder of different average particle size. That is, a further aspect of the present invention relates to a method of manufacturing the above magnetic tape comprising forming a magnetic layer with ferromagnetic powder in the form of first ferromagnetic powder and one or more kinds of ferromagnetic powder of greater average particle size than the first ferromagnetic powder.

The following embodiments are examples of desirable embodiments of the above manufacturing method. Two or more of the embodiments given below can be combined as a preferred embodiment of the above manufacturing method. The "first ferromagnetic powder" refers to one of the ferromagnetic powder among the two or more kinds of ferromagnetic powder employed, and desirably refers to the ferromagnetic powder that is employed in the greatest proportion as set forth above. Other details regarding the above manufacturing method are as set forth above.

The average particle size of the first ferromagnetic powder can fall within a range of 10 to 80 nm.

The difference between the average particle size of the ferromagnetic powder with an average particle size greater than that of the first ferromagnetic powder and the average particle size of the first ferromagnetic powder can fall within a range of 10 to 50 nm.

The mixing ratio of the first ferromagnetic powder to the ferromagnetic powder with an average particle size greater than that of the first ferromagnetic powder, by weight, can fall within a range of former:latter=90.0: 10.0 to 99.9:0.1.

In another embodiment, the above magnetic tape can be manufactured with additional nonmagnetic powder along with nonmagnetic powder with Mohs hardness of higher than 8 and nonmagnetic colloidal particles as nonmagnetic powder in the magnetic layer. That is, a further aspect of the present invention relates to a method of manufacturing a magnetic tape comprising forming the magnetic layer with additional nonmagnetic powder along with nonmagnetic powder with Mohs hardness of higher than 8 and nonmagnetic colloidal particles as the nonmagnetic powder.

The following embodiments are examples of desirable embodiments of the above manufacturing method. A combination of two or more of the following embodiments is a preferred embodiment of the above manufacturing method. Details regarding the above manufacturing method are as set forth above.

The average particle size of the additional nonmagnetic powder can be greater than the average particle size of the ferromagnetic powder.

The difference between the average particle size of the ferromagnetic powder and the average particle size of the additional nonmagnetic powder can fall within a range of 10 to 80 nm.

The mixing ratio of the ferromagnetic powder and the additional nonmagnetic powder, based on weight, can fall within a range of former:latter=90.0:10.0 to 99.9: 0.1.

EXAMPLES

The present invention will be described in greater detail below through Examples. However, the present invention is not limited to the embodiments shown in Examples. The "parts" and "percent (%)" indicated below denote "weight parts" and "weight percent (%)".

The weight average molecular weights described below are values measured by gel permeation chromatography (GPC) under the following measurement conditions and converted to the value with polystyrene conversion.
GPC device: HLC-8120 (made by Tosoh)
Column: TSK gel Multipore HXL-M (made by Tosoh, 7.8 mm ID (internal diameter)×30.0 cm)
Eluent: Tetrahydrofuran (THF)

Examples 1 to 18, Comparative Examples 1 to 14

1. Preparation of Alumina Dispersion 3.0 parts of 2,3-dihydroxynaphthalene (made by Tokyo Kasei), 31.3 parts of a 32% solution (with a solvent in the form of a mixed solvent of methyl ethyl ketone and toluene) of polyester polyurethane resin (UR-4800 (polar group content: 80 meq/kg) made by Toyobo (Japanese registered trademark) having polar groups in the form of $SO_3Na$ groups, and 570.0 parts of a mixed solution of methyl ethyl ketone and cyclohexanone 1:1 (weight ratio) were mixed per 100.0 parts of alumina powder with an α-conversion rate of about 65% and a BET specific surface area of 30 $m^2/g$ (HIT-70, made by Sumitomo Chemical) and dispersed for 5 hours with a paint shaker in the presence of zirconia beads. Following dispersion, the dispersion and beads were separated with mesh, yielding an alumina dispersion.

2. Formula of Coating Liquid for Forming Magnetic Layer

| (Magnetic liquid) | |
|---|---|
| Ferromagnetic powder (1) (See Table 1) | See Table 1 |
| Ferromagnetic powder (2) (See Table 1) | See Table 1 |
| Polyurethane resin with $SO_3Na$ groups (weight average molecular weight: 70,000, $SO_3Na$ groups: 0.2 meq/g) | 14.0 parts |
| Cyclohexanone | 150.0 parts |
| Methyl ethyl ketone | 150.0 parts |
| (Abrasive liquid) | |
| Alumina dispersion prepared in 1. above | 6.0 parts |
| (Silica sol) | |
| Colloidal silica (average particle size 100 nm) | 2.0 parts |
| Methyl ethyl ketone | 1.4 parts |
| (Other components) | |
| Stearic acid | 2.0 parts |
| Butyl stearate | 6.0 parts |
| Polyisocyanate (made by Nippon Polyurethane Industry, Coronate (Japanese registered trademark)) | 2.5 parts |
| (Finishing solvents) | |
| Cyclohexanone | 200.0 parts |
| Methyl ethyl ketone | 200.0 parts |

3. Formula of Coating Liquid for Forming Nonmagnetic Layer

| | |
|---|---|
| Nonmagnetic inorganic powder: α-iron oxide | 100.0 parts |
| Average particle size (average major axis length): 10 nm | |
| Average acicular ratio: 1.9 | |
| BET specific surface area: 75 $m^2/g$ | |
| Carbon black | 20.0 parts |
| Average particle size: 20 nm | |
| $SO_3Na$ group-containing polyurethane resin | 18.0 parts |
| (weight average molecular weight: 70,000; $SO_3Na$ groups: 0.2 meq/g) | |
| Stearic acid | 1.0 part |
| Cyclohexanone | 300.0 parts |
| Methyl ethyl ketone | 300.0 parts |

4. Formula of Coating Liquid for Forming Backcoat Layer

| | |
|---|---|
| Nonmagnetic inorganic powder: α-iron oxide | 80.0 parts |
| Average particle size (average major axis length): 0.15 μm | |
| Average acicular ratio: 7 | |
| BET specific surface area: 52 $m^2/g$ | |
| Carbon black | 20.0 parts |
| Average particle size: 20 nm | |
| Vinyl chloride copolymer | 13.0 parts |
| Sulfonate group-containing polyurethane resin | 6.0 parts |
| Phenylphosphonic acid | 3.0 part |
| Cyclohexanone | 155.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 200.0 parts |

5. Preparation of Coating Liquids for Forming Various Layers

The coating liquid for forming the magnetic layer was prepared by the following method. The above magnetic liquid was prepared by dispersing (bead dispersion) for 24 hours the various components in a batch-type vertical sand mill. Dispersing beads in the form of 0.5 mm Φ zirconia beads were employed. Using the sand mill, the magnetic liquid prepared and the above abrasive liquid were mixed with the other components (silica sol, other components, finishing solvents) and bead dispersed for 5 minutes. The mixture was then processed for 0.5 minute with a batch-type ultrasonic apparatus (20 kHz, 300 W) (ultrasonic dispersion). Subsequently, the mixture was filtered with a filter having an average pore diameter of 0.5 μm to prepare the coating liquid for forming the magnetic layer.

The coating liquid for forming the nonmagnetic layer was prepared by the following method. The various components—excluding the stearic acid, cyclohexane, and methyl ethyl ketone—were dispersed for 24 hours in a batch-type vertical sand mill to obtain a dispersion solution. Dispersion beads in the form of 0.1 mm Φ zirconia beads were employed. The remaining components were then added to the dispersion obtained and stirred with a dissolver. The dispersion thus obtained was filtered with a filter having an average pore size of 0.5 μm to prepare the coating liquid for forming the nonmagnetic layer.

The coating liquid for forming the backcoat layer was prepared by the following method. The various components—excluding the lubricants (stearic acid and butyl stearate), polyisocyanate, and cyclohexanone—were kneaded and diluted in an open kneader. Twelve passes of dispersion processing were then conducted in a horizontal bead mill disperser using 1 mm 0 zirconia beads at a bead fill rate of 80%, a rotor tip peripheral speed of 10 m/s, and with a single pass residence time of 2 minutes. Subsequently, the remaining components were added to the dispersion obtained and the mixture was stirred with a dissolver. The dispersion thus obtained was filtered with a filter having an average pore diameter of 1 μm to prepare the coating liquid for forming the backcoat layer.

6. Preparation of Magnetic Tape

The coating liquid for forming the nonmagnetic layer prepared in 5. above was coated and dried to the thickness shown in Table 1 on the surface of a support made of polyethylene naphthalate with the thickness indicated in Table 1. The coating liquid for forming the magnetic layer prepared in 5. above was then coated thereover in a manner calculated to yield the dry thickness indicated in Table 1. While the coating liquid for forming the magnetic layer was still wet, a magnetic field with 0.3 T was applied in a direction perpendicular to the coating surface of the coating liquid for forming the magnetic layer to conduct a perpendicular orientation treatment, and the coating was dried. Subsequently, the coating liquid for forming the backcoat layer that had been prepared in 5. above was coated and dried to the thickness indicated in Table 1 on the opposite surface of the polyethylene naphthalate support from the surface on which the nonmagnetic layer and magnetic layer had been formed.

A surface smoothing treatment was then conducted at a temperature of 100° C., a linear pressure of 300 kg/cm, and a speed of 100 m/min with a calendar comprised of only metal rolls. A heat treatment was conducted for 36 hours in an environment with a temperature of 70° C., after which the product was slit to ½ inch width to obtain a magnetic tape.

Examples 19 to 22

With the exception that the ferromagnetic powders (1) and (2) employed to prepare the magnetic liquid were replaced with the ferromagnetic powder and nonmagnetic powder (colcothar) of the types and in the formula ratios indicated in Table 1, magnetic tapes were obtained in the same manner as above.

The various layers of the magnetic tape, the nonmagnetic support, and the total thickness were obtained by the following methods.

A cross-section in the direction of thickness of the magnetic tape was exposed using an ion beam and the exposed cross-section was observed by a scanning electron microscope. The various thicknesses were obtained as the arithmetic averages of the thicknesses determined at two spots in the direction of thickness by observing cross-sections.

7. Evaluation Methods (1) Coefficient of Friction (Base Portion Friction) Measured on the Base Portion of the Surface of the Magnetic Layer Scribe marks were made in advance with a laser marker on the measurement surface and an atomic force microscope (AFM) image was measured in a portion at a certain distance (about 100 μm) from them. This was done at a viewing angle 7 μm square. As set forth further below, to facilitate the pickup up of a scanning electron microscope (SEM) image at the spot, a hard (single crystal silicon) cantilever was installed and scribe marks were made on the AFM. All protrusions with a height of greater than or equal to 15 nm above the reference plane were extracted from the AFM image thus measured. The spot where no protrusions were found was specified as the base portion. The base portion friction was measured by the method described above using a TI-950 Triboindenter made by Hysitron Corp.

A SEM image was measured at the same spot where the AFM had been measured and a component map was obtained. The protrusions greater than or equal to 15 nm in height above the reference plane that were extracted were determined to be protrusions formed of alumina or colloidal silica. In Examples 1 to 18, in the component map by SEM, alumina and colloidal silica were not confirmed on the base portion. In Examples 19 to 22, in the component map by SEM, alumina and colloidal silica were not confirmed on the base portion, but colcothar was. Component analysis was performed there by SEM. However, component analysis is not limited to SEM, and can be conducted by known methods such as energy dispersive X-ray spectrometry (EDS), auger electron spectroscopy (AES), or the like.

The measurement results are given in Table 1.

(2) Centerline Average Surface Roughness Ra Measured by Noncontact Surface Profile Measuring Apparatus on the Surface of the Magnetic Layer The centerline average surface roughness Ra of the magnetic layer surface was measured by the method set forth above using a New View 5022 noncontact optical roughness measuring apparatus made by Zygo Corp. The measurement results are given in Table 1.

(3) Measurement of Electromagnetic Characteristics (Signal-to-Noise Ratio (S/N Ratio)) at Initial Running and with Repeated Running and Calculation of Amount of Drop in S/N Ratio with Repeated Running The electromagnetic characteristics (signal-to-noise ratio (S/N ratio)) at initial running and with repeated running were measured by the method set forth below with a ½ inch reel tester on which a head was secured in an atmosphere in which the temperature was controlled to 32° C. and the relative humidity was controlled to 80%.

The head/tape relative speed was set to 5.5 m/s. A metal-in-gap (MIG) head (gap length 0.15 μm, track width 1.0 μm) was employed for recording. The recording current was set to the optimal level for each tape. A giant magnetoresistive (GMR) head with an element thickness of 15 nm, a shield gap of 0.1 μm, and a lead width of 0.5 μm was employed as the reproduction head. A signal was recorded at a linear recording density of 270 KFci and the reproduction signal was measured with a spectral analyzer made by Shibasoku. The ratio of the carrier signal output to the integrated noise of the full spectral band was adopted as the S/N ratio. The portion of the signal that fully stabilized after the start of running the magnetic tape was employed. Under the above conditions, 5,000 back and forth passes were made at 1,000 m per pass and recording and reproduction were conducted. The S/N ratio of the first pass and the S/N ratio of the 5,000th pass were determined, and the difference "(S/N ratio on first pass)−(S/N ratio on 5,000th pass)" is given in Table 1 as the drop in S/N ratio.

Magnetic tapes are generally required to exhibit little drop in electromagnetic characteristics with repeated running in the five environments of room temperature, low temperature high humidity, low temperature low humidity, high temperature high humidity, and high temperature low humidity. Of these five environments, a magnetic tape that exhibits a drop in S/N ratio of less than or equal to 2.0 dB in an atmosphere of a temperature of 32° C. and a relative humidity of 80, which corresponds to the high temperature high humidity environment at which a drop in electromagnetic characteristics with repeated running is generally said to occur, can be determined to exhibit excellent electromagnetic characteristics over extended periods with little drop in electromagnetic characteristics with repeated running.

Table 1 gives the details of the magnetic tapes of Examples and Comparative Examples. In Table 1, "BaFe" denotes ferromagnetic hexagonal barium ferrite powder, and "metal" denotes ferromagnetic metal powder. In Examples 1 to 18 and Comparative Examples 1 to 14, the formula ratios indicate the contents of the various ferromagnetic powders relative to 100.0 weight % of the total content of ferromagnetic powder. In Examples 19 to 22, they indicate the contents of ferromagnetic powder and colcothar relative to the combined quantity of ferromagnetic powder and colcothar. In the table, the average particle size of the ferromagnetic powder is the average plate diameter for ferromagnetic hexagonal barium ferrite powder, and the average major axis length for ferromagnetic metal powder. The average particle size of the ferromagnetic powder is a value obtained by collecting a required quantity from a lot of ferromagnetic powder used to prepare magnetic tape and measuring the average particle size by the method described above. Following measurement, the ferromagnetic powder was used to prepare the magnetic liquid for forming the magnetic tape. The same applies to the average particle size of colcothar and other components.

TABLE 1

| | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Ferromagnetic powder(1) | Type | BaFe | BaFe | BaFe | BaFe | BaFe | BaFe | BaFe |
| | Average particle size | 25 nm | 25 nm | 25 nm | 25 nm | 25 nm | 25 nm | 25 nm |
| | Formula ratio | 100.0% | 100.0% | 100.0% | 100.0% | 100.0% | 99.0% | 99.0% |
| Ferromagnetic powder(2) | Type | — | — | — | — | — | BaFe | BaFe |
| | Average particle size | — | — | — | — | — | 55 nm | 55 nm |
| | Formula ratio | — | — | — | — | — | 1.0% | 1.0% |
| (Average particle size of ferromagnetic powder(2)) – (Average particle size of ferromagnetic powder(1)) | | — | — | — | — | — | 30 nm | 30 nm |
| Thickness | Total thickness of magnetic tape | 6.00 μm | 5.50 μm | 5.00 μm | 4.80 μm | 4.80 μm | 5.50 μm | 5.00 μm |
| | Mangetic layer thickness | 0.10 μm | 0.10 μm | 0.10 μm | 0.10 μm | 0.10 μm | 0.10 μm | 0.10 μm |
| | Nonmangetic layer thickness | 1.00 μm | 0.70 μm | 0.50 μm | 0.50 μm | 0.50 μm | 0.70 μm | 0.50 μm |
| | Thickness of nonmagnetic support | 4.40 μm | 4.20 μm | 4.00 μm | 3.80 μm | 3.80 μm | 4.20 μm | 4.00 μm |
| | Backcoat layer thickness | 0.50 μm | 0.50 μm | 0.40 μm | 0.40 μm | 0.40 μm | 0.50 μm | 0.40 μm |
| Base portion friction | | 0.45 | 0.45 | 0.45 | 0.45 | 0.45 | 0.28 | 0.28 |
| Centerline average surface roughness Ra measured by noncontact surface profile measuring apparatus on the surface of the magnetic layer | | 1.8 nm | 1.8 nm | 1.8 nm | 1.8 nm | 1.5 nm | 1.8 nm | 1.8 nm |
| Drop in S/N ratio with repeated running | | 0.5 dB | 0.7 dB | 0.8 dB | 3.5 dB | 3.2 dB | 0.6 dB | 0.7 dB |

| | | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|
| Ferromagnetic powder (1) | Type | BaFe | BaFe | BaFe | Metal | Metal | Metal | Metal |
| | Average particle size | 25 nm | 25 nm | 25 nm | 35 nm | 35 nm | 35 nm | 32 nm |
| | Formula ratio | 99.3% | 99.3% | 99.3% | 100.0% | 100.0% | 100.0% | 99.0% |
| Ferromagnetic powder (2) | Type | BaFe | BaFe | BaFe | — | — | — | Metal |
| | Average particle size | 55 nm | 55 nm | 55 nm | — | — | — | 60 nm |
| | Formula ratio | 0.7% | 0.7% | 0.7% | — | — | — | 1.0% |
| (Average particle size of ferromagnetic powder (2)) – (Average particle size of ferromagnetic powder (1)) | | 30 nm | 30 nm | 30 nm | — | — | — | 28 nm |
| Thickness | Total thickness of magnetic tape | 4.80 μm | 4.50 μm | 4.30 μm | 5.50 μm | 5.00 μm | 4.80 μm | 5.20 μm |
| | Mangetic layer thickness | 0.10 μm | 0.10 μm | 0.10 μm | 0.10 μm | 0.10 μm | 0.10 μm | 0.10 μm |
| | Nonmangetic layer thickness | 0.50 μm | 0.30 μm | 0.20 μm | 0.70 μm | 0.50 μm | 0.50 μm | 0.50 μm |
| | Thickness of nonmagnetic support | 3.80 μm | 3.70 μm | 3.60 μm | 4.20 μm | 4.00 μm | 3.80 μm | 4.20 μm |
| | Backcoat layer thickness | 0.40 μm | 0.40 μm | 0.40 μm | 0.50 μm | 0.40 μm | 0.40 μm | 0.40 μm |
| Base portion friction | | 0.37 | 0.37 | 0.37 | 0.45 | 0.45 | 0.45 | 0.26 |
| Centerline average surface roughness Ra measured by noncontact surface profile measuring apparatus on the surface of the magnetic layer | | 1.8 nm | 1.8 nm | 1.8 nm | 1.8 nm | 1.8 nm | 1.8 nm | 1.5 nm |
| Drop in S/N ratio with repeated running | | 2.3 dB | 3.7 dB | 4.1 dB | 0.3 dB | 0.5 dB | 2.8 dB | 0.3 dB |

| | | Ex. 1 | Ex. 2 | Ex. 3 | Ex. 4 | Ex. 5 | Ex. 6 |
|---|---|---|---|---|---|---|---|
| Ferromagnetic powder (1) | Type | BaFe | BaFe | BaFe | BaFe | BaFe | BaFe |
| | Average particle size | 25 nm | 25 nm | 25 nm | 25 nm | 25 nm | 25 nm |
| | Formula ratio | 99.0% | 99.0% | 99.0% | 99.0% | 99.0% | 98.5% |
| Ferromagnetic powder (2) | Type | BaFe | BaFe | BaFe | BaFe | BaFe | BaFe |
| | Average particle size | 55 nm | 55 nm | 55 nm | 55 nm | 55 nm | 47 nm |
| | Formula ratio | 1.0% | 1.0% | 1.0% | 1.0% | 1.0% | 1.5% |
| (Average particle size of ferromagnetic powder (2)) – (Average particle size of ferromagnetic powder (1)) | | 30 nm | 30 nm | 30 nm | 30 nm | 30 nm | 22 nm |
| Thickness | Total thickness of magnetic tape | 4.80 μm | 4.50 μm | 4.30 μm | 4.80 μm | 4.80 μm | 4.80 μm |
| | Mangetic layer thickness | 0.10 μm | 0.10 μm | 0.10 μm | 0.10 μm | 0.10 μm | 0.10 μm |
| | Nonmangetic layer thickness | 0.50 μm | 0.30 μm | 0.20 μm | 0.50 μm | 0.50 μm | 0.50 μm |
| | Thickness of nonmagnetic support | 3.80 μm | 3.70 μm | 3.60 μm | 3.80 μm | 3.80 μm | 3.80 μm |
| | Backcoat layer thickness | 0.40 μm | 0.40 μm | 0.40 μm | 0.40 μm | 0.40 μm | 0.40 μm |
| Base portion friction | | 0.28 | 0.28 | 0.28 | 0.28 | 0.28 | 0.26 |
| Centerline average surface roughness Ra measured by noncontact surface profile measuring apparatus on the surface of the magnetic layer | | 1.5 nm | 1.5 nm | 1.5 nm | 1.8 nm | 1.3 nm | 1.5 nm |
| Drop in S/N ratio with repeated running | | 0.8 dB | 1.2 dB | 1.5 dB | 0.8 dB | 0.7 dB | 0.5 dB |

TABLE 1-continued

|  |  | Ex. 7 | Ex. 8 | Ex. 9 | Ex. 10 | Ex. 11 | Ex. 12 |
|---|---|---|---|---|---|---|---|
| Ferromagnetic powder (1) | Type | BaFe | BaFe | BaFe | BaFe | BaFe | BaFe |
|  | Average particle size | 35 nm | 35 nm | 35 nm | 35 nm | 22 nm | 28 nm |
|  | Formula ratio | 99.0% | 99.0% | 99.0% | 98.5% | 99.0% | 98.0% |
| Ferromagnetic powder (2) | Type | BaFe | BaFe | BaFe | BaFe | BaFe | BaFe |
|  | Average particle size | 55 nm | 55 nm | 55 nm | 47 nm | 55 nm | 55 nm |
|  | Formula ratio | 1.0% | 0.9% | 0.8% | 1.5% | 1.0% | 2.0% |
| (Average particle size of ferromagnetic powder (2)) − (Average particle size of ferromagnetic powder (1)) |  | 20 nm | 20 nm | 20 nm | 12 nm | 33 nm | 27 nm |
| Thickness | Total thickness of magnetic tape | 4.80 μm | 4.80 μm | 4.80 μm | 4.80 μm | 4.80 μm | 4.80 μm |
|  | Mangetic layer thickness | 0.10 μm | 0.10 μm | 0.10 μm | 0.10 μm | 0.10 μm | 0.10 μm |
|  | Nonmangetic layer thickness | 0.50 μm | 0.50 μm | 0.50 μm | 0.50 μm | 0.50 μm | 0.50 μm |
|  | Thickness of nonmagnetic support | 3.80 μm | 3.80 μm | 3.80 μm | 3.80 μm | 3.80 μm | 3.80 μm |
|  | Backcoat layer thickness | 0.40 μm | 0.40 μm | 0.40 μm | 0.40 μm | 0.40 μm | 0.40 μm |
| Base portion friction |  | 0.31 | 0.33 | 0.35 | 0.28 | 0.28 | 0.22 |
| Centerline average surface roughness Ra measured by noncontact surface profile measuring apparatus on the surface of the magnetic layer |  | 1.5 nm | 1.5 nm | 1.5 nm | 1.5 nm | 1.5 nm | 1.5 nm |
| Drop in S/N ratio with repeated running |  | 1.1 dB | 1.5 dB | 1.6 dB | 0.9 dB | 0.8 dB | 0.4 dB |

|  |  | Ex. 13 | Ex. 14 | Ex. 15 | Ex. 16 | Ex. 17 | Ex. 18 |
|---|---|---|---|---|---|---|---|
| Ferromagnetic powder (1) | Type | Metal | Metal | BaFe | BaFe | BaFe | Metal |
|  | Average particle size | 32 nm | 35 nm | 25 nm | 25 nm | 25 nm | 35 nm |
|  | Formula ratio | 99.0% | 99.0% | 99.0% | 97.0% | 95.0% | 98.5% |
| Ferromagnetic powder (2) | Type | Metal | Metal | Metal | BaFe | BaFe | Metal |
|  | Average particle size | 60 nm | 60 nm | 60 nm | 55 nm | 55 nm | 60 nm |
|  | Formula ratio | 1.0% | 1.0% | 1.0% | 3.0% | 5.0% | 1.5% |
| (Average particle size of ferromagnetic powder(2)) − (Average particle size of ferromagnetic powder(1)) |  | 28 nm | 25 nm | 35 nm | 30 nm | 30 nm | 25 nm |
| Thickness | Total thickness of magnetic tape | 4.80 μm | 4.80 μm | 4.80 μm | 4.80 μm | 4.80 μm | 4.80 μm |
|  | Mangetic layer thickness | 0.10 μm | 0.10 μm | 0.10 μm | 0.10 μm | 0.10 μm | 0.10 μm |
|  | Nonmangetic layer thickness | 0.50 μm | 0.50 μm | 0.50 μm | 0.50 μm | 0.50 μm | 0.50 μm |
|  | Thickness of nonmagnetic support | 3.80 μm | 3.80 μm | 3.80 μm | 3.80 μm | 3.80 μm | 3.80 μm |
|  | Backcoat layer thickness | 0.40 μm | 0.40 μm | 0.40 μm | 0.40 μm | 0.40 μm | 0.40 μm |
| Base portion friction |  | 0.26 | 0.25 | 0.25 | 0.23 | 0.2 | 0.23 |
| Centerline average surface roughness Ra measured by noncontact surface profile measuring apparatus on the surface of the magnetic layer |  | 1.5 nm | 1.5 nm | 1.5 nm | 1.5 nm | 1.5 nm | 1.5 nm |
| Drop in S/N ratio with repeated running |  | 0.5 dB | 0.5 dB | 0.7 dB | 0.3 dB | 0.3 dB | 0.3 dB |

|  |  | Ex. 19 | Ex. 20 | Ex. 21 | Ex. 22 |
|---|---|---|---|---|---|
| Ferromagnetic powder | Type | BaFe | BaFe | BaFe | BaFe |
|  | Average particle size | 25 nm | 25 nm | 25 nm | 25 nm |
|  | Formula ratio | 99.9% | 99.9% | 99.9% | 99.5% |
| Nonomagnetic powder (colcothar) | Average particle size | 50 nm | 70 nm | 100 nm | 50 nm |
|  | Formula ratio | 0.1% | 0.1% | 0.1% | 0.5% |
| (Average particle size of ferromagnetic powder (2)) − (Average particle size of ferromagnetic powder(1)) |  | 25 nm | 45 nm | 75 nm | 25 nm |
| Thickness | Total thickness of magnetic tape | 4.80 μm | 4.80 μm | 4.80 μm | 4.80 μm |
|  | Mangetic layer thickness | 0.10 μm | 0.10 μm | 0.10 μm | 0.10 μm |
|  | Nonmangetic layer thickness | 0.50 μm | 0.50 μm | 0.50 μm | 0.50 μm |
|  | Thickness of nonmagnetic support | 3.80 μm | 3.80 μm | 3.80 μm | 3.80 μm |
|  | Backcoat layer thickness | 0.40 μm | 0.40 μm | 0.40 μm | 0.40 μm |
| Base portion friction |  | 0.26 | 0.23 | 0.2 | 0.2 |
| Centerline average surface roughness Ra measured by noncontact surface profile measuring apparatus on the surface of the magnetic layer |  | 1.5 nm | 1.5 nm | 1.5 nm | 1.5 nm |
| Drop in S/N ratio with repeated running |  | 0.6 dB | 0.3 dB | 0.2 dB | 0.2 dB |

The following were determined based on the results in Table 1.

(1) In the magnetic tapes of Comparative Examples 1 to 3, 6, 7, 11, 12, and 14, which had total thicknesses exceeding 4.80 μm, regardless of whether the base portion friction was greater than, equal to, or less than 0.35, there was little drop in electromagnetic characteristics with repeated running. That is, no correlation was seen between the base portion friction and a drop in electromagnetic characteristics with repeated running.

(2) By contrast, in the magnetic tapes of Examples 1 to 22 with total thicknesses of less than or equal to 4.80 μm, based on a comparison with Comparative Examples 4, 5, 8 to 10, and 13 with total thicknesses of less than or equal to 4.80 μm, it was found that the drop in electromagnetic characteristics with repeated running could be inhibited in magnetic tapes with a total thickness of less than or equal to 4.80 μm by keeping the base portion friction to less than or equal to 0.35.

An aspect of the present invention is useful in the field of manufacturing magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises, on a nonmagnetic support, a nonmagnetic layer comprising nonmagnetic powder and binder, and on the nonmagnetic layer, a magnetic layer comprising ferromagnetic powder, nonmagnetic powder, and binder, wherein
a total thickness of the magnetic tape is less than or equal to 4.80 μm;
a coefficient of friction as measured on a base portion of a surface of the magnetic layer is less than or equal to 0.35; and
the base portion of the surface of the magnetic layer is defined as follows:
defining a plane where volumes of protruding components and volumes of indenting components equal out in a field of view as measured by an atomic force microscope as a reference plane, and defining protrusions as protrusions greater than or equal to 15 nm in height from the reference plane, the base portion is defined as the portion where the number of protrusions greater than or equal to 15 nm in height from the reference plane is zero.

2. The magnetic tape according to claim 1, wherein the ferromagnetic powder is selected from the group consisting of ferromagnetic hexagonal ferrite powder and ferromagnetic metal powder.

3. The magnetic tape according to claim 1, wherein the nonmagnetic powder contained in the magnetic layer comprises two or more kinds of nonmagnetic powder with different Mohs hardness.

4. The magnetic tape according to claim 1, wherein the nonmagnetic powder contained in the magnetic layer comprises inorganic powder with Mohs hardness of higher than 8.

5. The magnetic tape according to claim 1, wherein the nonmagnetic powder contained in the magnetic layer comprises nonmagnetic colloidal particles.

6. The magnetic tape according to claim 1, wherein the nonmagnetic powder contained in the magnetic layer comprises inorganic powder with Mohs hardness of higher than 8 and nonmagnetic colloidal particles.

7. The magnetic tape according to claim 1, wherein the nonmagnetic powder contained in the magnetic layer comprises additional nonmagnetic powder together with inorganic powder with Mohs hardness of higher than 8 and nonmagnetic colloidal particles.

8. The magnetic tape according to claim 7, wherein the additional nonmagnetic powder is colcothar.

9. The magnetic tape according to claim 1, wherein a centerline average surface roughness Ra measured with a noncontact surface profile measuring apparatus on the surface of the magnetic layer is less than or equal to 1.8 nm.

10. The magnetic tape according to claim 6, wherein a centerline average surface roughness Ra measured with a noncontact surface profile measuring apparatus on the surface of the magnetic layer is less than or equal to 1.8 nm.

11. The magnetic tape according to claim 7, wherein a centerline average surface roughness Ra measured with a noncontact surface profile measuring apparatus on the surface of the magnetic layer is less than or equal to 1.8 nm.

12. The magnetic tape according to claim 8, wherein a centerline average surface roughness Ra measured with a noncontact surface profile measuring apparatus on the surface of the magnetic layer is less than or equal to 1.8 nm.

13. The magnetic tape according to claim 1, wherein the coefficient of friction measured on the base portion of the surface of the magnetic layer is less than or equal to 0.30.

14. The magnetic tape according to claim 9, wherein the coefficient of friction measured on the base portion of the surface of the magnetic layer is less than or equal to 0.30.

15. The magnetic tape according to claim 10, wherein the coefficient of friction measured on the base portion of the surface of the magnetic layer is less than or equal to 0.30.

16. The magnetic tape according to claim 11, wherein the coefficient of friction measured on the base portion of the surface of the magnetic layer is less than or equal to 0.30.

17. The magnetic tape according to claim 12, wherein the coefficient of friction measured on the base portion of the surface of the magnetic layer is less than or equal to 0.30.

18. The magnetic tape according to claim 1, which comprises a backcoat layer comprising nonmagnetic powder and binder on an opposite surface of the nonmagnetic support from a surface on which the nonmagnetic layer and magnetic layer are present.

19. The magnetic tape according to claim 1, wherein the coefficient of friction as measured on a base portion of a surface of a magnetic layer is greater than or equal to 0.2 but less than or equal to 0.35.

* * * * *